(12) United States Patent
An et al.

(10) Patent No.: US 12,645,839 B2
(45) Date of Patent: Jun. 2, 2026

(54) OFFSET DATA INTEGRITY CHECKS FOR LATENCY REDUCTION

(71) Applicants: Advanced Micro Devices, Inc, Santa Clara, CA (US); ATI Technologies ULC, Markham (CA)

(72) Inventors: Shaofeng An, Markham (CA); Shiqi Sun, Newmarket (CA); Michael James Tresidder, Austin, TX (US); YanFeng Wang, Richmond hill (CA); Peter Malcolm Barnes, Mountain view, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 252 days.

(21) Appl. No.: 17/945,750

(22) Filed: Sep. 15, 2022

(65) Prior Publication Data

US 2024/0095404 A1      Mar. 21, 2024

(51) Int. Cl.
 *G06F 21/64*          (2013.01)
(52) U.S. Cl.
 CPC ..................................... *G06F 21/64* (2013.01)
(58) Field of Classification Search
 CPC ...................................................... G06F 21/64
 See application file for complete search history.

(56) References Cited

U.S. PATENT DOCUMENTS

| | | | |
|---|---|---|---|
| 7,991,750 B1* | 8/2011 | Xavier | G06F 11/08 |
| | | | 714/48 |
| 8,761,324 B1* | 6/2014 | Rosen | H04L 7/0008 |
| | | | 375/220 |

(Continued)

FOREIGN PATENT DOCUMENTS

| | | |
|---|---|---|
| KR | 1020210103455 A | 8/2021 |
| KR | 10-2389139 B1 | 4/2022 |
| WO | 2024059691 A1 | 3/2024 |

OTHER PUBLICATIONS

Harran, Martin, William Farrelly, and Kevin Curran. "A method for verifying integrity & authenticating digital media." Applied computing and informatics 14.2 (2018): 145-158. (Year: 2018).*

(Continued)

*Primary Examiner* — Madhuri R Herzog
(74) *Attorney, Agent, or Firm* — FIG. 1 Patents

(57) ABSTRACT

Data integrity checks for reducing communication latency is described. A transmitting endpoint transmits data to a receiving endpoint by generating an integrity tag for a first subset of data blocks and a second integrity tag for a second subset of data blocks. In implementations, the first and second integrity tags overlap at least one data block and are offset based on computational complexities of generating the integrity tags. A receiving endpoint generates comparison tags for each of the integrity tags and uses the comparison tags to validate an authenticity of received data. In response to validating the first and second integrity tags, data blocks covered by both the first and second integrity tags are released for use. Additional integrity tags are generated and validated for subsequent subsets of data blocks during data communication, thus reducing latency by offsetting times at which comparison tags are generated and validated.

20 Claims, 7 Drawing Sheets

200

(56)          References Cited

U.S. PATENT DOCUMENTS

| | | | |
|---|---|---|---|
| 11,616,597 B1 * | 3/2023 | Kutz ..................... | H04L 1/1867 |
| | | | 714/755 |
| 2007/0097817 A1 * | 5/2007 | Ling ............... | G11B 20/10527 |
| | | | 369/47.33 |
| 2009/0019337 A1 * | 1/2009 | Pi ......................... | H03M 13/09 |
| | | | 714/758 |
| 2015/0280741 A1 * | 10/2015 | Bryant ................. | H04L 1/0061 |
| | | | 714/807 |
| 2018/0004443 A1 * | 1/2018 | Carter ................... | G06F 3/0619 |
| 2018/0129826 A1 * | 5/2018 | Kim .......................... | H04L 9/14 |
| 2019/0220721 A1 | 7/2019 | Chhabra et al. | |
| 2020/0213331 A1 | 7/2020 | Li et al. | |
| 2021/0350028 A1 | 11/2021 | Yu | |
| 2024/0095404 A1 | 3/2024 | An et al. | |

OTHER PUBLICATIONS

PCT/US2023/074162 , "International Seach Report and Written Opinion", PCT Application No. PCT/US2023/074162, Jan. 5, 2024, 6 pages.

* cited by examiner

200

Tag 218

Data 202

Data 204

Data 206

Tag 224

Data 208

Tag 220

Data 210

Data 212

Data 214

Tag 226

Data 216

Tag 222

| Clock Cycle | Transmitting Endpoint | Receiving Endpoint |
|---|---|---|
| 1 | Send Data 202 | Receive Data 202 |
| 2 | Send Data 204 | Receive Data 204 |
| 3 | Send Data 206<br>Generate Tag 218 | Receive Data 206<br>Generate Comparison Tag for Tag 218 |
| 4 | Send Data 208<br>Generate Tag 224 | Receive Data 208<br>Generate Comparison Tag for Tag 224<br>*Release Data 202, 204, & 206 |
| 5 | Send Data 210 | Receive Data 210 |
| 6 | Send Data 212 | Receive Data 212 |
| 7 | Send Data 214<br>Generate Tag 220 | Receive Data 214<br>Generate Comparison Tag for Tag 220<br>*Release Data 208 |
| 8 | Send Data 216<br>Generate Tag 226 | Receive Data 216<br>Generate Comparison Tag for Tag 226<br>*Release Data 210, 212, & 214 |

Fig. 3

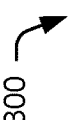

300

400

Tag 418

Data 402

Data 404

Tag 424

Data 406

Data 408

Tag 420

Data 410

Data 412

Tag 426

Data 414

Data 416

Tag 422

500

| Clock Cycle | Transmitting Endpoint | Receiving Endpoint |
| --- | --- | --- |
| 1 | Send Data 402 | Receive Data 402 |
| 2 | Send Data 404<br>Generate Tag 418 | Receive Data 404<br>Generate Comparison Tag for Tag 418 |
| 3 | Send Data 406 | Receive Data 406 |
| 4 | Send Data 408<br>Generate Tag 424 | Receive Data 408<br>Generate Comparison Tag for Tag 424<br>*Release Data 402 & 404 |
| 5 | Send Data 410 | Receive Data 410 |
| 6 | Send Data 412<br>Generate Tag 420 | Receive Data 412<br>Generate Comparison Tag for Tag 420<br>*Release Data 406 & 408 |
| 7 | Send Data 414 | Receive Data 414 |
| 8 | Send Data 416<br>Generate Tag 426 | Receive Data 416<br>Generate Comparison Tag for Tag 426<br>*Release Data 410 & 412 |

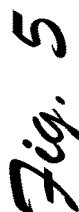

Fig. 5

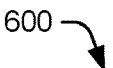

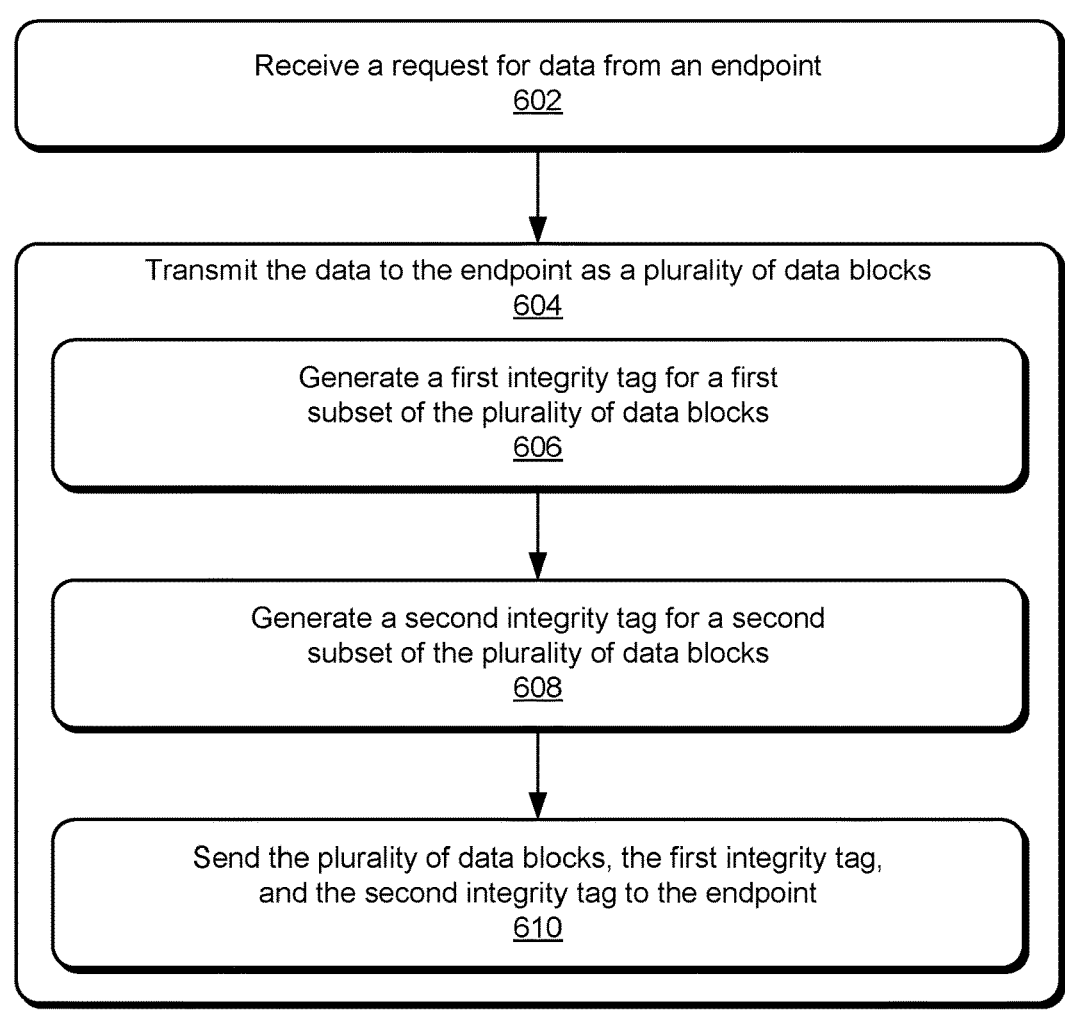

600

Receive a request for data from an endpoint
602

Transmit the data to the endpoint as a plurality of data blocks
604

Generate a first integrity tag for a first
subset of the plurality of data blocks
606

Generate a second integrity tag for a second
subset of the plurality of data blocks
608

Send the plurality of data blocks, the first integrity tag,
and the second integrity tag to the endpoint
610

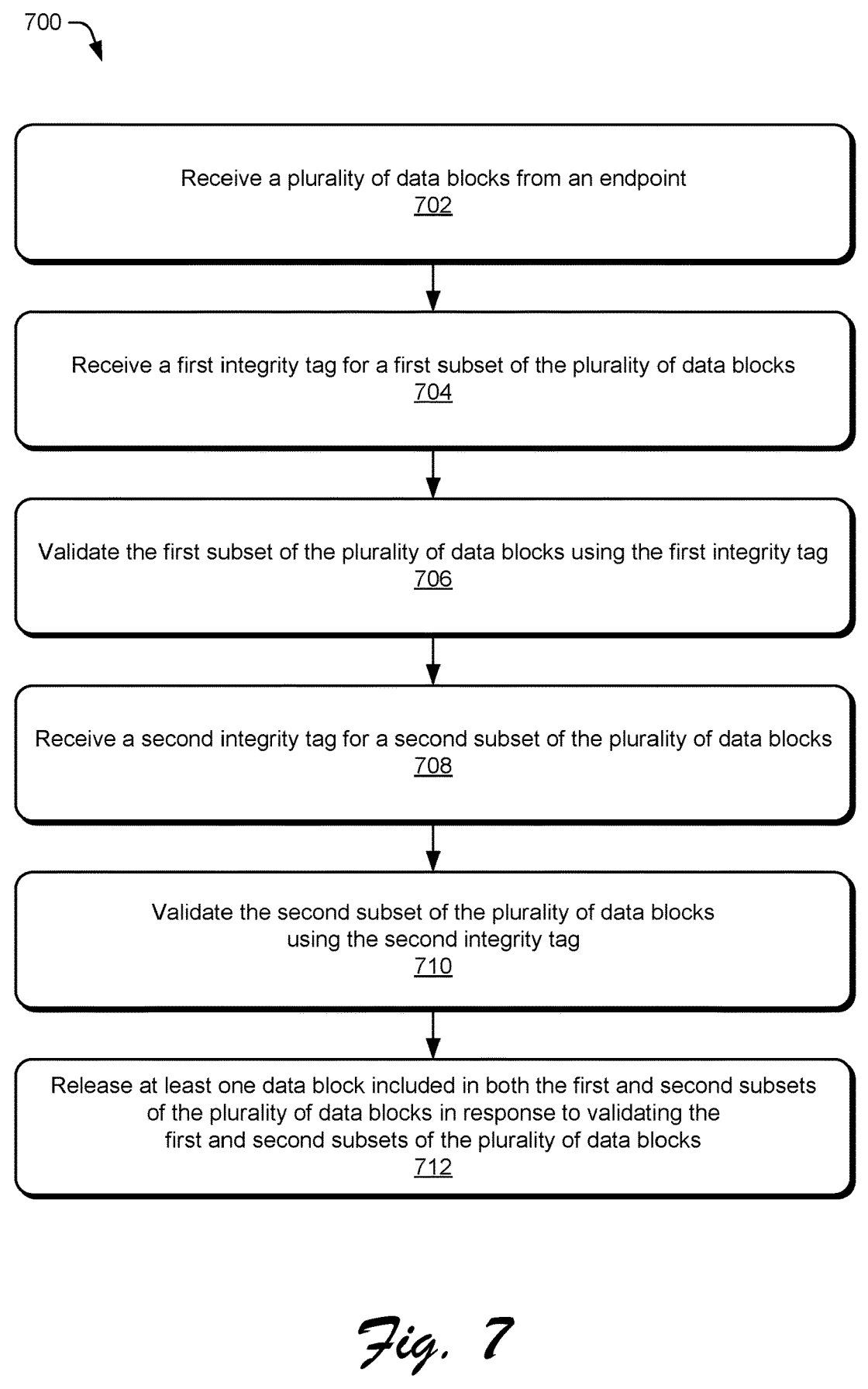

Receive a plurality of data blocks from an endpoint
702

Receive a first integrity tag for a first subset of the plurality of data blocks
704

Validate the first subset of the plurality of data blocks using the first integrity tag
706

Receive a second integrity tag for a second subset of the plurality of data blocks
708

Validate the second subset of the plurality of data blocks
using the second integrity tag
710

Release at least one data block included in both the first and second subsets
of the plurality of data blocks in response to validating the
first and second subsets of the plurality of data blocks
712

*Fig. 7*

OFFSET DATA INTEGRITY CHECKS FOR LATENCY REDUCTION

BACKGROUND

Computer technology is regularly advancing, resulting in faster computers. One area of advancement is hardware communication systems that transfer data between different endpoints. As new communication systems are developed, the rate at which data is transferred via the communication systems continues to increase. As a corollary to this increase in available bandwidth, communication systems are leveraged to provide a common means of communication among an increasing number of endpoints.

BRIEF DESCRIPTION OF THE DRAWINGS

The detailed description is described with reference to the accompanying figures.

FIG. 3 illustrates an example of operations performed by a transmitting endpoint and a receiving endpoint for authenticating data blocks in accordance with the illustrated example of FIG. 2.

FIG. 5 illustrates an example of operations performed by a transmitting endpoint and a receiving endpoint for authenticating data blocks in accordance with the illustrated example of FIG. 4.

FIG. 6 is a flow diagram depicting a procedure in an example implementation of using offset data integrity checks in accordance with the techniques described herein.

FIG. 7 is a flow diagram depicting a procedure in an example implementation of using offset data integrity checks in accordance with the techniques described herein.

DETAILED DESCRIPTION

Overview

Figure 1:
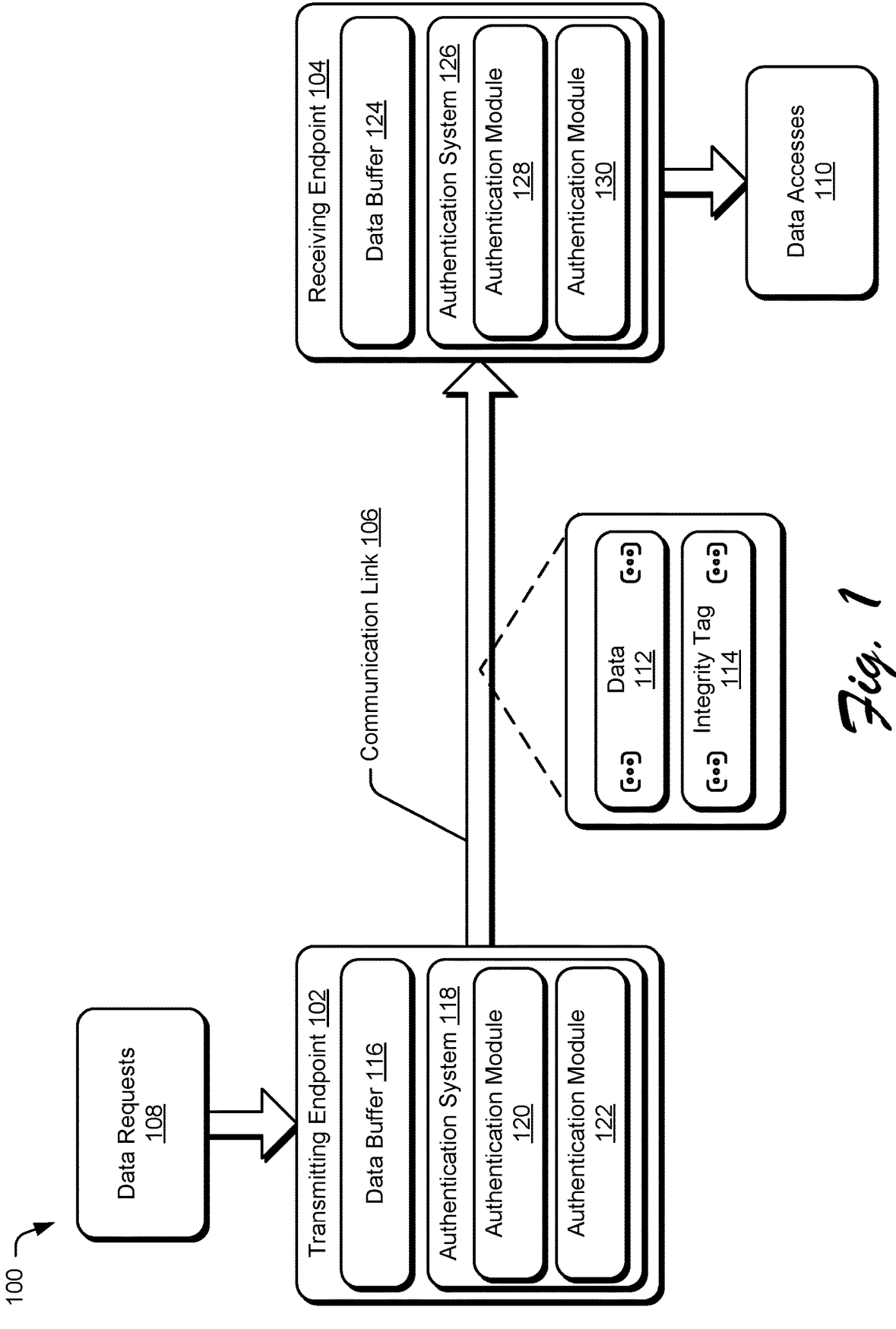
FIG. 1 is a block diagram of an example system having a communication link between endpoints that generate integrity tags for validating authenticity of data transmitted via the communication link.

Some conventional data communication systems perform data integrity checks at both transmitting and receiving endpoints and compare integrity check results to determine whether data is attacked, modified, or otherwise compromised during transmission. To do so, conventional systems perform a generate an integrity tag for a set of data blocks sent by the transmitting endpoint and received by the receiving endpoint using a data authentication calculation known to both endpoints. Some integrity tags are generated using simple linear calculations, which can be performed quickly and using minimal computational resources. However, as a tradeoff to simplicity, these linear calculations are relatively weak from a security standpoint, as a hacker can intercept and corrupt data in a manner that will still pass integrity tag verification at the receiving endpoint so long as the hacker knows the correct polynomial for the integrity tag calculation.

To improve data security, some conventional data communication systems generate multiple integrity tags for a set of data blocks, where at least one integrity tag is generated using complex data authentication calculations that involve rounds of computations and rotating security keys. Although such integrity tags improve data security due to their increased computational complexity, this increased computational complexity is difficult to perform in a single clock cycle, particularly for systems operating with high-speed communication protocols. Consequently, upon receiving a set of data blocks that are covered by multiple integrity tags, a receiving endpoint is forced to first verify each of the multiple integrity tags before the received blocks of data are useable. In scenarios where one of the multiple integrity tags is more computationally complex than another, the additional clock cycles required to authenticate the computationally complex integrity tag introduces undue delay into the communication system.

To solve these problems, offset data integrity checks are described. In a communication system that transmits data from a transmitting endpoint to a receiving endpoint, the described techniques generate different integrity tags for different sets of data blocks. Unlike conventional systems, the described techniques avoid generating different integrity tags for a common set of data blocks and instead offset integrity tags by a number of data blocks to reduce latency associated with verifying the integrity tags. For instance, in a scenario where data is sent from a transmitting endpoint to a receiving endpoint as a plurality of data blocks, the described techniques generate a first integrity tag for a first subset of the plurality of data blocks. The described techniques subsequently generate a second integrity tag, using a different data authentication calculation, for a second subset of the plurality of data blocks that includes at least one data block covered by the first integrity tag and at least one data block not covered by the first integrity tag.

In implementations, the number of data blocks covered by the first integrity tag and not covered by the second integrity tag, and vice versa, is defined by an offset value. The offset value represents any integer, and is determined based on various characteristics of the communication system. For instance, the offset value is determined based on a computational complexity of generating the first integrity tag, a computational complexity of generating the second integrity tag, a data storage format of a source from which the data is obtained by the transmitting endpoint, combinations thereof, and so forth.

By offsetting sets of data blocks covered by different integrity tags, the described techniques avoid latency that results from covering a common set of data blocks with different integrity tags where one of the different integrity tags is authenticated in fewer clock cycles than another one of the different integrity tags. Specifically, unlike conventional systems where data will be held back until each of the different integrity tags are authenticated for the common set of data blocks, the techniques described herein maximize a communication system throughput by accounting for time required to authenticate different integrity tags. Because communication systems are increasingly sensitive to latency, the techniques described herein advantageously increase communication system performance without sacrificing data security and avoid bandwidth penalties that result from communication system latency.

In some aspects, the techniques described herein relate to a method including receiving a request for data from a receiving endpoint and transmitting the data to the receiving endpoint as a plurality of data blocks by generating a first integrity tag for a first subset of the plurality of data blocks, generating a second integrity tag for a second subset of the plurality of data blocks, the second subset having at least one data block included in the first subset and at least one data block excluded from the first subset, and sending the plurality of data blocks, the first integrity tag, and the second integrity tag to the receiving endpoint.

In some aspects, the techniques described herein relate to a method, wherein the at least one data block included in the first subset and second subset includes a number of data blocks defined by an offset value that is determined based on a computational complexity of generating the first integrity tag.

In some aspects, the techniques described herein relate to a method, wherein the at least one data block included in the first subset and second subset includes a number of data blocks defined by an offset value that is determined based on a computational complexity of generating the second integrity tag.

In some aspects, the techniques described herein relate to a method, wherein the at least one data block included in the first subset and second subset includes a number of data blocks defined by an offset value determined based on a data storage format of a source from which the data is obtained.

In some aspects, the techniques described herein relate to a method, wherein sending the plurality of data blocks to the receiving endpoint is performed over a plurality of clock cycles and comprises sending one of the plurality of data blocks to the receiving endpoint during each of the plurality of clock cycles.

In some aspects, the techniques described herein relate to a method, wherein sending the first integrity tag to the receiving endpoint is performed responsive to generating the first integrity tag.

In some aspects, the techniques described herein relate to a method, wherein sending the second integrity tag to the receiving endpoint is performed responsive to generating the second integrity tag and is performed during a different clock cycle than sending the first integrity tag to the receiving endpoint.

In some aspects, the techniques described herein relate to a method, wherein generating the first integrity tag is performed using a first data authentication calculation and generating the second integrity tag is performed using a second data authentication calculation that is different than the first data authentication calculation.

In some aspects, the techniques described herein relate to a method, the method further including causing the receiving endpoint to generate a first comparison tag for the first subset of the plurality of data blocks upon receiving the first subset of the plurality of data blocks and compare the first integrity tag against the first comparison tag.

In some aspects, the techniques described herein relate to a method, wherein the first integrity tag and the first comparison tag are computed using a common data authentication calculation.

In some aspects, the techniques described herein relate to a method, the method further including causing the receiving endpoint to generate a second comparison tag for the second subset of the plurality of data blocks upon receiving the second subset of the plurality of data blocks and compare the second integrity tag against the second comparison tag.

In some aspects, the techniques described herein relate to a method, wherein the second integrity tag and the second comparison tag are computed using a common data authentication calculation.

In some aspects, the techniques described herein relate to a method, the method further including causing the receiving endpoint to release the at least one data block included in both the first subset and the second subset in response to validating both the first integrity tag and the second integrity tag and maintain the at least one data block included in the second subset and excluded from the first subset in a data buffer in response to validating both the first integrity tag and the second integrity tag.

In some aspects, the techniques described herein relate to a method including receiving a plurality of data blocks from a transmitting endpoint, receiving a first integrity tag for a first subset of the plurality of data blocks, generating a first comparison tag for the first subset of the plurality of data blocks and validating an authenticity of the first subset of the plurality of data blocks by comparing the first integrity tag with the first comparison tag, receiving a second integrity tag for a second subset of the plurality of data blocks, the second subset of the plurality of data blocks having at least one data block included in the first subset of the plurality of data blocks and at least one data block excluded from the first subset of the plurality of data blocks, generating a second comparison tag for the second subset of the plurality of data blocks and validating an authenticity of the second subset of the plurality of data blocks by comparing the second integrity tag with the second comparison tag, and releasing the at least one data block included in the first subset and the second subset of the plurality of data blocks responsive to validating the authenticity of the first subset and the second subset of the plurality of data blocks.

In some aspects, the techniques described herein relate to a method, wherein receiving the plurality of data blocks is performed over a plurality of clock cycles and comprises receiving one of the plurality of data blocks during each of the plurality of clock cycles.

In some aspects, the techniques described herein relate to a method, wherein generating the first comparison tag is performed using a data authentication calculation used by the transmitting endpoint to generate the first integrity tag.

In some aspects, the techniques described herein relate to a method, wherein generating the second comparison tag is performed using a data authentication calculation used by the transmitting endpoint to generate the second integrity tag.

In some aspects, the techniques described herein relate to a method, wherein generating the first comparison tag is performed using a first data authentication calculation and generating the second comparison tag is performed using a second data authentication calculation that is different than the first data authentication calculation.

In some aspects, the techniques described herein relate to a method, the method further including maintaining the at least one data block included in the second subset and excluded from the first subset in a data buffer in response to validating both the first integrity tag and the second integrity tag.

In some aspects, the techniques described herein relate to a system including a transmitting endpoint configured to transmit data to a receiving endpoint as a plurality of data blocks by generating a first integrity tag for a first subset of the plurality of data blocks, generating a second integrity tag for a second subset of the plurality of data blocks, the second subset having at least one data block included in the first subset and at least one data block excluded from the first subset, and sending the plurality of data blocks, the first integrity tag, and the second integrity tag to the receiving endpoint, the receiving endpoint configured to conditionally release the plurality of data blocks by generating a first comparison tag for the first subset of the plurality of data blocks and validating an authenticity of the first subset of the plurality of data blocks by comparing the first integrity tag with the first comparison tag, generating a second comparison tag for the second subset of the plurality of data blocks and validating an authenticity of the second subset of the plurality of data blocks by comparing the second integrity tag with the second comparison tag, and releasing the at least one data block included in the first subset and the second subset of the plurality of data blocks responsive to validating the authenticity of the first subset and the second subset of the plurality of data blocks.

FIG. 1 is a block diagram of an example system 100 having a communication link between endpoints that generate integrity tags for validating authenticity of data transmitted via the communication link. Specifically, the system 100 includes a transmitting endpoint 102 and a receiving endpoint 104. The system 100 further includes a communication link 106 communicatively coupling the transmitting endpoint 102 and the receiving endpoint 104.

The transmitting endpoint 102 and the receiving endpoint 104 represent devices configured to interface with one another via the communication link 106. For instance, by way of example and not limitation, the transmitting endpoint 102 and the receiving endpoint 104 represent processors (e.g., graphics processing units and central processing units), disk array controllers, hard disk drive host adapters, memory cards, solid-state drives, wireless communications hardware connections, Ethernet hardware connections, switches, bridges, network interface controllers, and so forth.

In one or more implementations, the system 100 is implemented in software. For example, the system 100 part of an operating system of a computing device or software of a computing device component configured to facilitate communication between the transmitting endpoint 102 and the receiving endpoint 104. Additionally or alternatively, the system 100 is implemented in hardware. For example, the system 100 is implemented in an integrated circuit of a computing device component configured to facilitate communication between the transmitting endpoint 102 and the receiving endpoint 104, such as an integrated circuit of a PCI bus. By way of another example, the system 100 resides in the same device package or integrated circuit as the receiving endpoint 104.

Thus, the system 100 is implementable in a smartphone or other wireless phone, a tablet or phablet computer, a notebook computer (e.g., netbook or ultrabook), a laptop computer, a desktop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, one or more servers (e.g. a datacenter), and so forth.

The transmitting endpoint 102 and the receiving endpoint 104 are configured to communicate with one another via the communication link 106. In implementations, the communication link 106 is bi-directional, such that the receiving endpoint 104 transmits a request for data to the transmitting endpoint 102 via the communication link 106 and the transmitting endpoint 102 transmits requested data to the receiving endpoint 104 via the communication link 106.

Alternatively, the communication link 106 facilitates data transmission in a single direction (e.g., transmission of data by the transmitting endpoint 102 to the receiving endpoint 104 over the communication link 106. In some implementations where the communication link 106 facilitates data transmission in a single direction, the system 100 further includes one or more additional communication links (not shown) between the transmitting endpoint 102 and the receiving endpoint 104. In at least one scenario where the communication link 106 facilitates transmission of data from the transmitting endpoint 102 for receipt by the receiving endpoint 104, for instance, an additional communication link facilitates transmission of a request for data from the receiving endpoint 104 to the transmitting endpoint 102.

The communication link 106 is representative of a variety of different communication mechanisms that interface the transmitting endpoint 102 and the receiving endpoint 104. For instance, in one or more implementations the communication link 106 is configured as a Peripheral Component Interconnect Express (PCIe) connection between the transmitting endpoint 102 and the receiving endpoint 104. Alternatively or additionally, the communication link 106 is configured as a Compute Express Link (CXL), an inter-chip Global Memory Interconnect (xGMI), an NVLink, and so forth, between the transmitting endpoint 102 and the receiving endpoint 104. In some implementations, the communication link 106 represents a wireless communication link between the transmitting endpoint 102 and the receiving endpoint 104, such as a Near Field Communication (NEC) link, a Bluetooth link, a Wi-Fi link, and the like. In this manner, the communication link 106 is representative of any wired communication link, wireless communication link, or combination thereof, that communicatively couples transmitting endpoint 102 and receiving endpoint 104.

Via the communicative coupling by communication link 106, the transmitting endpoint 102 is configured to manage data requests 108, such as requests for data from the receiving endpoint 104, requests from another entity to transmit data to the receiving endpoint 104, or combinations thereof. For instance, the transmitting endpoint 102 receives data requests 108 from a variety of sources, such as a hard disk, a network card, a processing device component linked to the system 100 via a universal serial bus (USB), a graphics card, a CXL device, an accelerator, and so forth. Data transmitted from the transmitting endpoint 102 to the receiving endpoint 104 is subsequently released by the receiving endpoint 104 to a destination, represented as data accesses 110 in the illustrated example of FIG. 1. The destination to which data accesses 110 are granted is representative of a variety of destinations, such as physical memory (e.g., DRAM, Flash memory, PCM, and so forth), a hard disk, a network card, a graphics card, a CXL device, a hardware accelerator, and so forth.

The receiving endpoint 104 is configured to conditionally release received data 112, on the condition that data 112 received from the transmitting endpoint 102 via the communication link 106 is verified using integrity tags 114 generated by the transmitting endpoint 102. As described in further detail below, the integrity tags 114 are generated by the transmitting endpoint 102 and transmitted to the receiving endpoint 104 via the communication link 106 for use in identifying whether data 112 was accessed, modified, or otherwise compromised during transmission.

In response to receiving a request or instruction to transmit data 112 to the receiving endpoint 104, the transmitting endpoint 102 obtains the data 112 from a data source (e.g., a database) and maintains the data 112 in a data buffer 116. The data buffer 116 is configured to maintain data 112 in memory and abstain from releasing the data 112 for transmission via the communication link 106 to the receiving endpoint 104 until an appropriate time (e.g., until the receiving endpoint 104 indicates to the transmitting endpoint 102 an availability to process data 112).

In some implementations, the data buffer 116 is configured to maintain data 112 on a first-in, first-out (FIFO) basis. Alternatively, the data buffer 116 is configured to maintain data 112 based on information specifying a maximum latency for a destination to which the receiving endpoint 104 grants data accesses 110. In some implementations, the transmitting endpoint 102 transmits the data 112 to the receiving endpoint 104 via the communication link 106 over a plurality of clock cycles, where each clock cycle involves transmitting a single block of the data 112. For instance, in some implementations the receiving endpoint 104 indicates to the transmitting endpoint 102 a number of available credits for a given clock cycle, where the number of available credits indicates an amount of data 112 the receiving endpoint 104 is capable of receiving during the given clock cycle.

In these implementations, the transmitting endpoint 102 identifies a block of the data 112 that does not exceed the number of available credits and transmits the block of data 112 to the receiving endpoint 104 during the given clock cycle. Portions of data 112 obtained by the transmitting endpoint 102 from a data source as part of servicing the data requests 108 that are not included in the transmitted block of data are maintained in the data buffer 116 for transmission as part of an additional block of data 112 during a subsequent clock cycle.

The transmitting endpoint 102 includes an authentication system 118, which represents functionality of the transmitting endpoint 102 to generate integrity tags 114 for the data 112. To do so, the authentication system 118 implements a plurality of authentication modules, represented in the illustrated example of FIG. 1 as authentication module 120 and authentication module 122. Although illustrated as including two authentication modules, the authentication system 118 is configured to include any number of authentication modules in accordance with the techniques described herein.

The authentication module 120 and the authentication module 122 are each configured to generate an integrity tag 114 using a known data authentication calculation. In some implementations, the authentication module 120 and the authentication module 122 each generate an integrity tag 114 for one or more blocks of data 112 using a common data authentication calculation. Alternatively, the authentication module 120 and the authentication module 122 each generate an integrity tag 114 for one or more blocks of data 112 using different data authentication calculations. Example data authentication calculations include AES-GCM authentication tag calculation, cyclic redundancy check (CRC) calculations, parity tag calculations, and so forth. In this manner, an integrity tag 114 generated by an authentication module of the authentication system 118 is representative of a message integrity code or message authentication code that is generated according to a known algorithm or computational calculation.

The authentication module 120 and the authentication module 122 are each configured to generate an integrity tag 114 using one or more blocks of the data 112. The transmitting endpoint 102 is similarly configured to transmit each integrity tag 114 to the receiving endpoint 104 together with an indication of the blocks of data 112 from which the integrity tag 114 was generated as well as a type of data authentication calculation that was used to generate the integrity tag 114. For instance, in some implementations the transmitting endpoint 102 generates each integrity tag 114 to include a header that describes the blocks of data 112 from which the integrity tag 114 was generated as well as an authentication calculation performed in generating the integrity tag 114.

Alternatively or additionally, the system 100 is pre-configured such that the transmitting endpoint 102 and the receiving endpoint 104 are configured to perform a certain data authentication calculation on predefined blocks of data. In this manner, the transmitting endpoint 102 and receiving endpoint 104 are configured to securely communicate data 112 via the communication link 106 without communicating information describing data authentication calculations used to verify an data 112 integrity. As an example, in some implementations the system 100 is pre-configured such that the transmitting endpoint 102 and receiving endpoint 104 perform certain data authentication calculations based on a format of the data 112 transmitted via the communication link 106. As described in further detail below, the authentication system 118 is configured to generate integrity tags 114 for blocks of data 112 that are offset from one another based on various considerations.

As described herein, an offset value refers to an amount of data blocks that are encompassed by different integrity tags 114 generated by respective authentication modules of the authentication system 118. As an example, in a scenario where an offset value is defined as two, an integrity tag 114 generated by the authentication module 120 is generated using two blocks of data 112 that are also used by the authentication module 122 in generating an integrity tag 114 for a subsequent set of blocks of data 112. In some implementations the authentication system 118 determines an offset value that defines a number of data blocks included in computing sequential integrity tags 114 based on a computational complexity of an authentication calculation used to generate one of the sequential integrity tags 114. For instance, the offset value is defined based on a computational complexity (e.g., a number of clock cycles required to complete) associated with an authentication calculation performed by the authentication module 120, an authentication calculation performed by the authentication module 122, or combinations thereof.

As an example, in an implementation where the authentication module 120 uses a linear calculation to generate an integrity tag 114, the linear calculation is relatively simple and can be completed in a single clock cycle. Conversely, in an implementation where the authentication module 122 uses a more computationally complex calculation to generate an integrity tag 114 (e.g., a calculation that involves multiple layers of XOR logic), the calculations require multiple clock cycles to complete when performed in high-speed communication interfaces. Accordingly, the authentication system 118 designates an offset value based on the computational complexities of calculations performed by each of the authentication modules 120 and 122, such that the offset value minimizes latency associated with generating integrity tags 114 and generating comparison tags to authenticate a validity of data 112 transferred via the communication link 106.

Alternatively or additionally, the offset value is defined based on a data storage format of a source from which the data 112 is obtained by the transmitting endpoint 102. For instance, in an example scenario where the data 112 is obtained from a database having a relatively small storage format (e.g., 16 bit), the offset value is smaller than an instance where the data 112 is obtained from a database having a relatively large storage format (e.g., 256 bit). Alternatively or additionally, the offset value used in generating the integrity tags 114 is determined based on a transmission speed of the communication link 106. For instance, a first offset value is used for low-speed communication protocols and a second offset value is used for high-speed communication protocols.

The transmitting endpoint 102 communicates the data 112 to the receiving endpoint 104 as a sequence of data blocks over a plurality of clock cycles. In accordance with one or more implementations, the transmitting endpoint 102 transmits a single block of data to the receiving endpoint 104 during a single clock cycle. The authentication system 118 generates integrity tags 114 for different subsets of data blocks and transmits the integrity tags 114 to the receiving endpoint 104 via the communication link 106, thereby enabling authentication of the data 112. The number of data blocks included in a subset of data blocks is configurable as any suitable integer. In some implementations, a number of data blocks included in a subset of data blocks is selected based on a type of calculation used to generate an integrity tag 114 for the subset of data blocks. For instance, in an example implementation where the authentication module 120 performs CRC calculations to generate an integrity tag 114 and authentication module 122 performs AES-GCM authentication tag calculations to generate an integrity tag 114, each of the integrity tags 114 are generated for different subsets of data blocks that each include four blocks of data 112.

The transmitting endpoint 102 transmits multiple blocks of the data 112 to the receiving endpoint 104 and causes each authentication module of the authentication system 118 to generate an integrity tag 114 for a subset of data blocks after transmitting each of the subset of data blocks to the receiving endpoint 104. Upon completing calculations involved in generating the integrity tag 114, the transmitting endpoint 102 transmits the integrity tag 114 to the receiving endpoint 104 via the communication link 106.

Upon receiving the data 112 and the integrity tags 114 generated for different subsets of blocks of the data 112, the receiving endpoint 104 maintains the data 112 and the integrity tags integrity tag 114 in a data buffer 124. The data buffer 116 is configured to maintain data 112 in memory and abstain from releasing the data 112 to a destination as one or more data accesses 110 until after the receiving endpoint 104 verifies an authenticity of the data 112 received via the communication link 106 using the integrity tags 114.

The receiving endpoint 104 additionally includes an authentication system 126. The authentication system 126 represents functionality of the receiving endpoint 104 to generate a comparison tag for each received integrity tag 114 using received blocks of data 112 and validate the integrity tags 114 before releasing data 112 associated with an integrity tag 114 as part of data accesses 110. To do so, the authentication system 126 includes a plurality of authentication modules, represented in the illustrated example of FIG. 1 as authentication module 128 and authentication module 128. Although illustrated as including two authentication modules, the authentication system 126 is configured to include any number of authentication modules in accordance with the techniques described herein. In some implementations, the authentication system 126 includes a counterpart authentication module for each authentication module included in authentication system 118.

For instance, the authentication module 120 and the authentication module 128 are each configured to generate an integrity tag for a subset of blocks of data 112 using a first data authentication calculation, and the authentication module 122 and the authentication module 130 are each configured to generate an integrity tag for a subset of blocks of data using a second data authentication calculation. In some implementations, the first and second data authentication calculations are the same data authentication calculation. Alternatively, the second data authentication calculation is different from the first data authentication calculation.

Upon receiving each block of data 112, the receiving endpoint 104 stores the blocks of data 112 in the data buffer 124. Upon receiving an integrity tag 114, the receiving endpoint 104 identifies, based on metadata associated with the integrity tag 114, a data authentication calculation used to generate the integrity tag 114 as well as a subset of the data blocks received via the communication link 106 and maintained in the data buffer 124 from which the integrity tag 114 was generated. For example, consider a scenario where a received integrity tag 114 includes metadata indicating that a CRC calculation was performed on a first four blocks of data 112 received via the communication link 106. Upon receipt of the integrity tag 114, the authentication system 126 identifies an authentication module (e.g., authentication module 128 or authentication module 130) configured to perform a CRC calculation and causes the authentication module to generate a comparison tag by performing the CRC calculation on the first four blocks of data 112 maintained in the data buffer 124.

When causing the authentication module to generate the comparison tag by performing the CRC calculation on the first four blocks of data 112 maintained in the data buffer 124, the receiving endpoint 104 does so without providing the integrity tag 114 to the authentication system 126, such that the comparison tag is generated independently on received data 112, without an ability to copy the integrity tag 114. The receiving endpoint 104 then compares the integrity tag 114 against the comparison tag generated for a common subset of data blocks and determines whether the received blocks of data 112 are authentic based on the comparison. For instance, if the integrity tag 114 matches the comparison tag, the blocks of data 112 are determined to be authentic.

The receiving endpoint 104 is configured to maintain received blocks of data 112 in the data buffer 124 and abstain from releasing the blocks of data 112 to a destination as one or more data accesses 110 until verifying an authenticity of each block of data 112 using the multiple data authentication calculations performed by the authentication system 118. The receiving endpoint 104 is configured to ascertain a number of different data authentication calculations, and type of each of the different data authentication calculations, performed by the authentication system 118. Upon determining which data authentication calculations are performed as part of generating each of the integrity tags 114 covering a given block of data 112, the receiving endpoint 104 causes the authentication system 126 to generate comparison tags using the each of the data authentication calculations. The receiving endpoint 104 then compares each of the comparison tags to corresponding ones of the integrity tags 114 and releases individual blocks of data 112 after confirming an authenticity of all integrity tags 114 covering the individual blocks of data 112.

For instance, continuing the above example where a received integrity tag 114 includes metadata indicating that a CRC calculation was performed on a first four blocks of data 112, consider a scenario where an additional received integrity tag 114 includes metadata indicating that an AES-GCM authentication tag calculation was performed on a first two blocks of data 112. In this example scenario, the receiving endpoint 104 ascertains that the transmitting endpoint 102 is generating integrity tags 114 using only CRC and AES-GCM authentication tag calculations.

Upon receipt of the additional integrity tag 114, the authentication system identifies an authentication module (e.g., authentication module 128 or authentication module 130) configured to perform an AES-GCM authentication tag calculation and causes the authentication module to generate a comparison tag by performing the AES-GCM authentication tag calculation on the first two blocks of data 112 maintained in the data buffer 124. After confirming that the comparison tag generated using the AES-GCM authentication tag calculation on the first two blocks of data matches the additional integrity tag 114, the receiving endpoint 104 releases the first two blocks of data to a destination as one of the data accesses 110. Even having already confirmed an authenticity of the integrity tag 114 generated using a CRC calculation on blocks three and four of the data 112, the receiving endpoint 104 maintains blocks three and four of the data 112 in the data buffer 124 until validating an authenticity of the integrity tag 114 for blocks three and four generated using the AES-GCM calculation.

By offsetting subsets of data blocks that are covered by different ones of the integrity tags 114, the techniques described herein reduce latency associated with confirming authenticity of multiple integrity tags 114 associated with a single data block before releasing the data block to a destination as one of the data accesses 110. For a detailed description of how offset integrity tags 114 are used to facilitate transmission and authentication of data 112 between a transmitting endpoint 102 and a receiving endpoint 104 while reducing latency, consider FIGS. 2 and 3.

Figure 2:
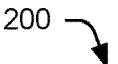
FIG. 2 illustrates an example of a sequence of data blocks transmitted between endpoints and offset integrity tags used to validate authenticity of the data blocks.

FIG. 2 illustrates an example 200 of a sequence of data blocks transmitted between endpoints and offset integrity tags used to validate authenticity of the data blocks.

In the illustrated example of FIG. 2, data 202, data 204, data 206, data 208, data 210, data 212, data 214, and data 216 each represent individual blocks of data 112 sent from the transmitting endpoint 102 to the receiving endpoint 104 via the communication link 106. In accordance with one or more implementations, the illustrated example 200 depicts a flow of data 112 communicated over a plurality of clock cycles, such that each block of data 112 is communicated from the transmitting endpoint 102 to the receiving endpoint 104 during a single clock cycle.

Tag 218, tag 220, tag 222, tag 224, and tag 226 each represent one of the integrity tags 114 generated by the authentication system 118. For instance, tag 218, tag 220, and tag 222 each represent one of the integrity tags 114 generated by authentication module 120 using a first data authentication calculation. Tag 224 and tag 226 each represent one of the integrity tags 114 generated by authentication module 122 using a second data authentication calculation that is different than the first data authentication calculation.

For instance, tag 218 is generated by performing a CRC calculation on data 202, data 204, data 206, and a data block preceding data 202 (not depicted) in the illustrated example 200. Tag 220 is generated by performing a CRC calculation on data 208, data 210, data 212, and data 214. Tag 222 is generated by performing a CRC calculation on data 216 and three data blocks following data 216 (not depicted) in the illustrated example 200. Continuing this example, tag 224 is generated by performing an AES-GCM calculation on data 202, data 204, data 206, and data 208. Finally, tag 226 is generated by performing an AES-GCM calculation on data 210, data 212, data 214, and data 216.

FIG. 3 illustrates an example 300 of operations performed by a transmitting endpoint and a receiving endpoint for authenticating data blocks in accordance with the illustrated example of FIG. 2. Specifically, the illustrated example 300 depicts a table that includes three columns, where the left column specifies a clock cycle during which operations performed in conjunction with the illustrated example 200 are initiated. In the illustrated example 300, the center column of the table describes operations initiated by a transmitting endpoint (e.g., the transmitting endpoint 102) and the right column describes operations initiated by a receiving endpoint (e.g., the receiving endpoint 104) during each corresponding clock cycle.

During first clock cycle, the transmitting endpoint 102 sends data 202 and the receiving endpoint 104 receives data 202. During the second clock cycle, the transmitting endpoint 102 sends, and the receiving endpoint 104 receives, data 204.

During the third clock cycle, the transmitting endpoint 102 sends data 206 and initiates generating tag 218 by processing data 202, data 204, data 206, and the data block preceding data 202 using authentication module 120. Although not represented in the illustrated example 300, the transmitting endpoint 102 sends tag 218 to the receiving endpoint 104 via communication link 106 upon completion of generating the tag 218. In some implementations, the tag 218 is generated and sent during the third clock cycle. Alternatively, in implementations where generating the tag 218 requires multiple clock cycles to complete, the transmitting endpoint 102 sends the tag 218 to the receiving endpoint 104 after the third clock cycle, upon completion of generating the tag 218.

In a similar manner, during the third clock cycle the receiving endpoint 104 receives data 206 and generates a comparison tag for tag 218. To do so, the receiving endpoint 104 processes data 202, data 204, data 206, and the data block preceding data 202, as maintained in the data buffer 124, using authentication module 128. The authentication module 128 is configured to generate the comparison tag for tag 218 using a common data authentication calculation, such that the authentication module 120 and the authentication module 128 perform the same data authentication calculation in generating tag 218 and the comparison tag for tag 218, respectively. Upon completion of generating the comparison tag for tag 218, the receiving endpoint 104 determines whether data blocks represented by data 202, data 204, and data 206 are authentic by comparing tag 218 and the comparison tag for tag 218. Even if the tag 218 and the comparison tag for tag 218 are determined to match and indicate that the covered data blocks are authentic, the receiving endpoint 104 abstains from releasing the covered data blocks (e.g., data 202, data 204, and data 206) to a destination as one or more data accesses 110 until all integrity tags 114 associated with the data blocks have been authenticated.

During the fourth clock cycle, the transmitting endpoint 102 sends data 208 and initiates generating the tag 224 by processing data 202, data 204, data 206, and data 208 using the authentication module 122. Although not depicted in the illustrated example 300, the transmitting endpoint 102 sends tag 224 to the receiving endpoint 104 via communication link 106 upon completion of generating the tag 224.

In a similar manner, during the fourth clock cycle the receiving endpoint 104 receives data 208 and generates a comparison tag for tag 224. To do so, the receiving endpoint 104 processes data 202, data 204, data 206, and data 208, as maintained in the data buffer 124, using authentication module 130. The authentication module 130 is configured to generate the comparison tag for tag 224 using a common data authentication calculation, such that the authentication module 122 and the authentication module 130 perform the same data authentication calculation in generating tag 224 and the comparison tag for tag 224, respectively. Upon completion of generating the comparison tag for tag 224, the receiving endpoint 104 determines whether data blocks represented by data 202, data 204, data 206, and data 208 are authentic by comparing tag 224 and the comparison tag for tag 224.

Upon determining that the tag 224 and the comparison tag for tag 224 match, the receiving endpoint 104 releases data 202, data 204, and data 206 to a destination as data accesses 110. The asterisk in the illustrated example 300 indicates that this release of data 202, data 204, and data 206 is conditional on both the comparison tag for tag 218 and the comparison tag for tag 224 matching the respective tag 218 and tag 224. Notably, during this release of data 202, data 204, and data 206, the receiving endpoint 104 abstains from releasing data 208. This is because data 208 was included in a subset of data blocks for which tag 224 was generated and excluded from the subset of data blocks for which tag 218 was generated. In this manner, the receiving endpoint 104 ensures that data blocks are not released to a destination as part of data accesses 110 until verifying that each data block is authentic using multiple integrity tags 114 generated for the data block.

During fifth clock cycle, the transmitting endpoint 102 sends data 208 and the receiving endpoint 104 receives data 208. During the sixth clock cycle, the transmitting endpoint 102 sends, and the receiving endpoint 104 receives, data 210.

During the seventh clock cycle, the transmitting endpoint 102 sends data 214 and initiates generating tag 220 by processing data 208, data 210, data 212, and data 214 using authentication module 120. The transmitting endpoint 102 further sends tag 220 to the receiving endpoint 104 via communication link 106 after generating the tag 220.

In a similar manner, during the seventh clock cycle the receiving endpoint 104 receives data 214 and generates a comparison tag for tag 220. To do so, the receiving endpoint 104 processes data 208, data 210, data 212, and data 214, as maintained in the data buffer 124, using authentication module 128. The authentication module 128 is configured to generate the comparison tag for tag 220 using the same data authentication calculation as performed by the authentication module 120 in generating the tag 220. Upon completion of generating the comparison tag for tag 220, the receiving endpoint 104 determines whether data blocks represented by data 208, data 210, data 212, and data 214 are authentic by comparing tag 220 and the comparison tag for tag 220. Upon determining that the comparison tag matches tag 220, and conditional upon the previously generated comparison tag matching tag 224, the receiving endpoint 104 releases data 208 to the destination as part of data accesses 110. When releasing data 208, data 210, data 212, and data 214 are maintained in the data buffer 124 until a second integrity tag 114 is authenticated for each of the data blocks.

During the eighth clock cycle, the transmitting endpoint 102 sends data 216 and initiates generating the tag 226 by processing data 210, data 212, data 214, and data 216 using the authentication module 122. Although not depicted in the illustrated example 300, the transmitting endpoint 102 sends tag 226 to the receiving endpoint 104 via communication link 106 upon completion of generating the tag 226.

In a similar manner, during the eighth clock cycle the receiving endpoint 104 receives data 216 and generates a comparison tag for tag 226. To do so, the receiving endpoint 104 processes data 210, data 212, data 214, and data 216, as maintained in the data buffer 124, using authentication module 130. The authentication module 130 is configured to generate the comparison tag for tag 226 using a common data authentication calculation, such that the authentication module 122 and the authentication module 130 perform the same data authentication calculation in generating tag 226 and the comparison tag for tag 226, respectively. Upon completion of generating the comparison tag for tag 226, the receiving endpoint 104 determines whether data blocks represented by data 210, data 212, data 214, and data 216 are authentic by comparing tag 226 and the comparison tag for tag 226.

Upon determining that the tag 226 and the comparison tag for tag 226 match, the receiving endpoint 104 releases data 210, data 212, and data 214 to a destination as data accesses 110. The asterisk in the illustrated example 300 indicates that this release of data 210, data 212, and data 214 is conditional on both the comparison tag for tag 220 and the comparison tag for tag 226 matching the respective tag 220 and tag 226. When data 210, data 212, and data 214 is released, the receiving endpoint 104 abstains from releasing data 216 until a subsequent authentication of tag 222 is performed. In this manner, the receiving endpoint 104 ensures that data blocks are not released to a destination as part of data accesses 110 until verifying that each data block is authentic using multiple integrity tags 114 generated for the data block.

FIGS. 2 and 3 depict an implementation of the transmitting endpoint 102 and the receiving endpoint 104 verifying data 112 authenticity using integrity tags 114 that are spaced using an offset value where one data block covered by an integrity tag 114 is excluded from a subsequently generated integrity tag 114, and so forth.

Figure 4:
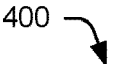
FIG. 4 illustrates an example of a sequence of data blocks transmitted between endpoints and offset integrity tags used to validate authenticity of the data blocks.

For a detailed description of how integrity tags 114 spaced using a different offset value are used to facilitate transmission and authentication of data 112 between a transmitting endpoint 102 and a receiving endpoint 104 while reducing latency, consider FIGS. 4 and 5.

FIG. 4 illustrates an example 400 of a sequence of data blocks transmitted between endpoints and offset integrity tags used to validate authenticity of the data blocks.

In the illustrated example of FIG. 4, data 402, data 404, data 406, data 408, data 410, data 412, data 414, and data 416 each represent individual blocks of data 112 sent from the transmitting endpoint 102 to the receiving endpoint 104 via the communication link 106. In accordance with one or more implementations, the illustrated example 200 depicts a flow of data 112 communicated over a plurality of clock cycles, such that each block of data 112 is communicated from the transmitting endpoint 102 to the receiving endpoint 104 during a single clock cycle.

Tag 418, tag 420, tag 422, tag 424, and tag 426 each represent one of the integrity tags 114 generated by the authentication system 118. For instance, tag 418, tag 420, and tag 422 each represent one of the integrity tags 114 generated by authentication module 120 using a first data authentication calculation. Tag 424 and tag 426 each represent one of the integrity tags 114 generated by authentication module 122 using a second data authentication calculation that is different than the first data authentication calculation.

For instance, tag 418 is generated by performing a CRC calculation on data 402, data 404, and two data blocks preceding data 402 (not depicted) in the illustrated example 400. Tag 420 is generated by performing a CRC calculation on data 406, data 408, data 410, and data 412. Tag 422 is generated by performing a CRC calculation on data 414, data 416, and two data blocks following data 416 (not depicted). Continuing this example, tag 424 is generated by performing an AES-GCM calculation on data 402, data 404, data 406, and data 408. Finally, tag 226 is generated by performing an AES-GCM calculation on data 410, data 412, data 414, and data 416.

FIG. 5 illustrates an example 500 of operations performed by a transmitting endpoint and a receiving endpoint for authenticating data blocks in accordance with the illustrated example of FIG. 4. Specifically, the illustrated example 500 depicts a table that includes three columns, where the left column specifies a clock cycle during which operations performed in conjunction with the illustrated example 500 are initiated. In the illustrated example 500, the center column of the table describes operations initiated by a transmitting endpoint (e.g., the transmitting endpoint 102) and the right column describes operations initiated by a receiving endpoint (e.g., the receiving endpoint 104) during each corresponding clock cycle.

During the first clock cycle, the transmitting endpoint 102 sends data 402 and the receiving endpoint 104 receives the data 402. During the second clock cycle, the transmitting endpoint 102 sends data 404 and initiates generating tag 418 by processing data 402 and data 404 using authentication module 120. Although not depicted in the illustrated example 500, the transmitting endpoint 102 sends tag 418 to the receiving endpoint 104 via communication link 106 upon completion of generating the tag 418.

During the second clock cycle the receiving endpoint 104 receives data 404 and initiates generating a comparison tag for the tag 418. To do so, the receiving endpoint 104 processes data 402 and data 404, as maintained in the data buffer 124, using authentication module 128. The authentication module 128 is configured to generate the comparison tag for tag 418 using a common data authentication calculation, such that the authentication module 120 and the authentication module 128 perform the same data authentication calculation in generating tag 418 and the comparison tag for tag 418, respectively. Upon completion of generating the comparison tag for tag 418, the receiving endpoint 104 determines whether data blocks represented by data 402 and data 404 are authentic by comparing tag 418 and the comparison tag for tag 418. Even if the tag 418 and the comparison tag for tag 418 are determined to match and indicate that the covered data blocks are authentic, the receiving endpoint 104 abstains from releasing the covered data blocks (e.g., data 402 and data 406) to a destination as one or more data accesses 110 until all integrity tags 114 associated with the data blocks have been authenticated.

During the third clock cycle, the transmitting endpoint 102 sends data 406 and the receiving endpoint 104 receives the data 406. During the fourth clock cycle, the transmitting endpoint 102 sends data 408 and initiates generating tag 424 by processing data 402, data 404, data 406, and data 408 using authentication module 122. Although not depicted in the illustrated example 500, the transmitting endpoint 102 sends tag 424 to the receiving endpoint 104 via communication link 106 upon completion of generating the tag 424.

During the fourth clock cycle the receiving endpoint 104 receives data 408 and initiates generating a comparison tag for the tag 424. To do so, the receiving endpoint 104 processes data 402, data 404, data 406, and data 408, as maintained in the data buffer 124, using authentication module 130. The authentication module 130 is configured to generate the comparison tag for tag 424 using a common data authentication calculation, such that the authentication module 122 and the authentication module 130 perform the same data authentication calculation in generating tag 424 and the comparison tag for tag 424, respectively. Upon completion of generating the comparison tag for tag 424, the receiving endpoint 104 determines whether data blocks represented by data 402, data 404, data 406, and data 408 are authentic by comparing tag 424 and the comparison tag for tag 424.

Upon determining that the tag 424 and the comparison tag for tag 424 match, the receiving endpoint 104 releases data 402 and data 404 to a destination as data accesses 110. The asterisk in the illustrated example 500 indicates that this release of data 402 and data 404 is conditional on both the comparison tag for tag 418 and the comparison tag for tag 424 matching the respective tag 418 and tag 424. Notably, during this release of data 402 and data 404, the receiving endpoint 104 abstains from releasing data 406 and data 408.

During the fifth clock cycle, the transmitting endpoint 102 sends data 410 and the receiving endpoint 104 receives the data 410. During the sixth clock cycle, the transmitting endpoint 102 sends data 412 and initiates generating tag 420 by processing data 406, data 408, data 410, and data 412 using authentication module 120. Although not depicted in the illustrated example 500, the transmitting endpoint 102 sends tag 420 to the receiving endpoint 104 via communication link 106 upon completion of generating the tag 420.

During the sixth clock cycle the receiving endpoint 104 receives data 412 and initiates generating a comparison tag for the tag 420. To do so, the receiving endpoint 104 processes data 406, data 408, data 410, and data 412, as maintained in the data buffer 124, using authentication module 128. The authentication module 128 is configured to generate the comparison tag for tag 420 using a common data authentication calculation, such that the authentication module 120 and the authentication module 128 perform the same data authentication calculation in generating tag 420 and the comparison tag for tag 420, respectively. Upon completion of generating the comparison tag for tag 420, the receiving endpoint 104 determines whether data blocks represented by data 406, data 408, data 410, and data 412 are authentic by comparing tag 420 and the comparison tag for tag 420.

Upon determining that the tag 420 and the comparison tag for tag 420 match, the receiving endpoint 104 releases data 406 and data 408 to a destination as data accesses 110. The asterisk in the illustrated example 500 indicates that this release of data 406 and data 408 is conditional on both the comparison tag for tag 420 and the comparison tag for tag 424 matching the respective tag 420 and tag 424. Notably, during this release of data 406 and data 408, the receiving endpoint 104 abstains from releasing data 410 and data 412.

During the seventh clock cycle, the transmitting endpoint 102 sends data 414 and the receiving endpoint 104 receives the data 414. During the eighth clock cycle, the transmitting endpoint 102 sends data 416 and initiates generating tag 426 by processing data 410, data 412, data 414, and data 416 using authentication module 122. Although not depicted in the illustrated example 500, the transmitting endpoint 102 sends tag 426 to the receiving endpoint 104 via communication link 106 upon completion of generating the tag 426.

During the eighth clock cycle the receiving endpoint 104 receives data 416 and initiates generating a comparison tag for the tag 426. To do so, the receiving endpoint 104 processes data 410, data 412, data 414, and data 416, as maintained in the data buffer 124, using authentication module 130. The authentication module 130 is configured to generate the comparison tag for tag 426 using a common data authentication calculation, such that the authentication module 122 and the authentication module 130 perform the same data authentication calculation in generating tag 426 and the comparison tag for tag 426, respectively. Upon completion of generating the comparison tag for tag 426, the receiving endpoint 104 determines whether data blocks represented by data 410, data 412, data 414, and data 416 are authentic by comparing tag 426 and the comparison tag for tag 426.

Upon determining that the tag 426 and the comparison tag for tag 426 match, the receiving endpoint 104 releases data 410 and data 412 to a destination as data accesses 110. The asterisk in the illustrated example 500 indicates that this release of data 410 and data 412 is conditional on both the comparison tag for tag 420 and the comparison tag for tag 426 matching the respective tag 420 and tag 426. During this release of data 410 and data 412, the receiving endpoint 104 abstains from releasing data 414 and data 416 until a subsequent authentication of tag 422 is performed. In this manner, the receiving endpoint 104 ensures that data blocks are not released to a destination as part of data accesses 110 until verifying that each data block is authentic using multiple integrity tags 114 generated for the data block.

FIG. 6 depicts a procedure 600 in an example implementation of using offset data integrity checks in accordance with the techniques described herein. A request for data is received from an endpoint (block 602). By way of example, the transmitting endpoint 102 receives one or more data requests 108 from the receiving endpoint 104.

The data is transmitted to the endpoint as a plurality of data blocks (block 604). By way of example, the transmitting endpoint 102 transmits data 112 as a plurality of data blocks to the receiving endpoint 104 via the communication link 106. As part of transmitting the data 112 to the receiving endpoint 104, a first integrity tag is generated for a first subset of the plurality of data blocks (block 606). By way of example, the transmitting endpoint 102 generates tag 220 by processing data 208, data 210, data 212, and data 214 using authentication module 120.

As further part of transmitting the data 112 to the receiving endpoint 104, a second integrity tag is generated for a second subset of the plurality of data blocks (block 608). By way of example, the transmitting endpoint 102 generates tag 226 by processing data 210, data 212, data 214, and data 216 using authentication module 122.

As further part of transmitting the data 112 to the receiving endpoint 104, the plurality of data blocks, the first integrity tag, and the second integrity tag are sent to the endpoint (block 610). By way of example, the transmitting endpoint 102 sends data 208, data 210, data 212, data 214, data 216, tag 220, and tag 226 to the receiving endpoint 104 via the communication link 106.

FIG. 7 depicts a procedure 700 in an example implementation of using offset data integrity checks in accordance with the techniques described herein. A plurality of data blocks are received from an endpoint (block 702). By way of example, the receiving endpoint 104 receives data 112 as a plurality of data blocks that includes data 202, data 204, data 206, data 208, data 210, data 212, data 214, and data 216 from the transmitting endpoint 102 via communication link 106.

A first integrity tag is received for a first subset of the plurality of data blocks (block 704). By way of example, the receiving endpoint 104 receives tag 220 for a first subset of data blocks of the data 112 that comprises data 208, data 210, data 212, and data 214. The first subset of the plurality of data blocks is validated using the first integrity tag (block 706). By way of example, the receiving endpoint 104 generates a comparison tag for tag 220 by processing the data 208, data 210, data 212, and data 214 using a same authentication calculation that was used by the transmitting endpoint 102 to generate tag 220. The receiving endpoint 104 then compares the tag 220 to the comparison tag for tag 220 as part of authenticating the first subset of data blocks of the data 112.

A second integrity tag is received for a second subset of the plurality of data blocks (block 708). By way of example, the receiving endpoint 104 receives tag 226 for a second subset of data blocks of the data 112 that comprises data 210, data 212, data 214, and data 216. The second subset of the plurality of data blocks is validated using the second integrity tag (block 710). By way of example, the receiving endpoint 104 generates a comparison tag for tag 226 by processing the data 210, data 212, data 214, and data 216 using a same authentication calculation that was used by the transmitting endpoint 102 to generate tag 226. The receiving endpoint 104 then compares the tag 226 to the comparison tag for tag 226 as part of authenticating the second subset of data blocks of the data 112.

At least one data block included in both the first and second subsets of the plurality of data blocks is released in response to validating the first and second subsets of the plurality of data blocks (block 712). By way of example, the receiving endpoint 104 releases data 210, data 212, and data 214 to a destination as part of data accesses 110 in response to the comparison tags matching tag 220 and tag 226, respectively.

Although features and elements are described above in particular combinations, each feature or element is usable alone without the other features and elements or in various combinations with or without other features and elements. In this manner, many variations are possible based on the disclosure herein.

The various functional units illustrated in the figures and/or described herein (including, where appropriate, the transmitting endpoint 102, the receiving endpoint 104, the communication link 106, the authentication system 118, and the authentication system 126) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. [ono] In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   receiving a request for data from a receiving endpoint; and
   transmitting the data to the receiving endpoint as a plurality of data blocks by:
      generating a first integrity tag for a first subset of the plurality of data blocks;
      generating a second integrity tag for a second subset of the plurality of data blocks, the second subset comprising at least one data block excluded from the first subset and at least one data block included in the first subset, wherein a number of data blocks included in both the first subset and the second subset is based on a data storage format of the data; and
      sending the plurality of data blocks, the first integrity tag, and the second integrity tag to the receiving endpoint.

2. The method of claim 1, wherein the number of data blocks included in both the first subset and the second subset is further based on a computational complexity of generating the first integrity tag.

3. The method of claim 1, wherein the number of data blocks included in both the first subset and the second subset is further based on a computational complexity of generating the second integrity tag.

4. The method of claim 1, wherein sending the plurality of data blocks to the receiving endpoint is performed over a plurality of clock cycles and comprises sending one of the plurality of data blocks to the receiving endpoint during each of the plurality of clock cycles.

5. The method of claim 1, wherein sending the first integrity tag to the receiving endpoint is performed responsive to generating the first integrity tag.

6. The method of claim 1, wherein sending the second integrity tag to the receiving endpoint is performed responsive to generating the second integrity tag and is performed during a different clock cycle than sending the first integrity tag to the receiving endpoint.

7. The method of claim 1, wherein generating the first integrity tag is performed using a first data authentication calculation and generating the second integrity tag is performed using a second data authentication calculation that is different than the first data authentication calculation.

8. The method of claim 1, further comprising causing the receiving endpoint to generate a first comparison tag for the first subset of the plurality of data blocks upon receiving the first subset of the plurality of data blocks and compare the first integrity tag against the first comparison tag.

9. The method of claim 8, wherein the first integrity tag and the first comparison tag are computed using a common data authentication calculation.

10. The method of claim 1, further comprising causing the receiving endpoint to generate a second comparison tag for the second subset of the plurality of data blocks upon receiving the second subset of the plurality of data blocks and compare the second integrity tag against the second comparison tag.

11. The method of claim 10, wherein the second integrity tag and the second comparison tag are computed using a common data authentication calculation.

12. The method of claim 1, further comprising causing the receiving endpoint to release the at least one data block included in both the first subset and the second subset in response to validating both the first integrity tag and the second integrity tag; and maintain the at least one data block included in the second subset and excluded from the first subset in a data buffer in response to validating both the first integrity tag and the second integrity tag.

13. A method comprising:
   receiving a plurality of data blocks from a transmitting endpoint;
   receiving a first integrity tag for a first subset of the plurality of data blocks, the first subset of the plurality of data blocks comprising at least one data block excluded from a second subset of the plurality of data blocks;
   generating a first comparison tag for the first subset of the plurality of data blocks and validating an authenticity of the first subset of the plurality of data blocks by comparing the first integrity tag with the first comparison tag;
   receiving a second integrity tag for the second subset of the plurality of data blocks, the second subset of the plurality of data blocks comprising at least one data block included in the first subset of the plurality of data blocks and at least one data block excluded from the first subset of the plurality of data blocks, wherein a number of data blocks included in both the first subset and the second subset is based on a data storage format of the plurality of data blocks;
   generating a second comparison tag for the second subset of the plurality of data blocks and validating an authenticity of the second subset of the plurality of data blocks by comparing the second integrity tag with the second comparison tag; and
   releasing the at least one data block included in the first subset and the second subset of the plurality of data blocks responsive to validating the authenticity of the first subset and the second subset of the plurality of data blocks.

14. The method of claim 13, wherein receiving the plurality of data blocks is performed over a plurality of clock cycles and comprises receiving one of the plurality of data blocks during each of the plurality of clock cycles.

15. The method of claim 13, wherein generating the first comparison tag is performed using a data authentication calculation used by the transmitting endpoint to generate the first integrity tag.

16. The method of claim 13, wherein generating the second comparison tag is performed using a data authentication calculation used by the transmitting endpoint to generate the second integrity tag.

17. The method of claim 13, wherein generating the first comparison tag is performed using a first data authentication calculation and generating the second comparison tag is performed using a second data authentication calculation that is different than the first data authentication calculation.

18. The method of claim 13, further comprising maintaining the at least one data block included in the second subset and excluded from the first subset in a data buffer in response to validating both the first integrity tag and the second integrity tag.

19. A system comprising:
   a transmitting endpoint implemented in hardware and configured to transmit data to a receiving endpoint implemented in hardware as a plurality of data blocks by:

generating a first integrity tag for a first subset of the plurality of data blocks, the first subset of the plurality of data blocks comprising at least one data block excluded from a second subset of the plurality of data blocks;

generating a second integrity tag for the second subset of the plurality of data blocks, the second subset comprising at least one data block included in the first subset and at least one data block excluded from the first subset, wherein a number of data blocks included in both the first subset and the second subset is based on a data storage format of the data; and sending the plurality of data blocks, the first integrity tag, and the second integrity tag to the receiving endpoint; and receiving endpoint configured to conditionally release the plurality of data blocks by:

generating a first comparison tag for the first subset of the plurality of data blocks and validating an authenticity of the first subset of the plurality of data blocks by comparing the first integrity tag with the first comparison tag;

generating a second comparison tag for the second subset of the plurality of data blocks and validating an authenticity of the second subset of the plurality of data blocks by comparing the second integrity tag with the second comparison tag; and releasing the at least one data block included in the first subset and the second subset of the plurality of data blocks responsive to validating the authenticity of the first subset and the second subset of the plurality of data blocks.

20. The system of claim 19, wherein the transmitting endpoint is configured to generate the plurality of data blocks such that a number of data blocks included in the first subset and the second subset is further based on at least one of:

a computational complexity of generating the first integrity tag; or a computational complexity of generating the second integrity tag.

* * * * *